United States Patent
Chen et al.

(10) Patent No.: US 9,739,996 B2
(45) Date of Patent: Aug. 22, 2017

(54) AUTOMATIC ASTRONOMICAL OBSERVATION SYSTEM AND OBSERVATION METHOD

(71) Applicant: Jack Chen, Suzhou, Jiangsu (CN)

(72) Inventors: Jack Chen, Suzhou (CN); Danfeng Hu, Jiangsu (CN)

(*) Notice: Subject to any disclaimer, the term of this patent is extended or adjusted under 35 U.S.C. 154(b) by 0 days.

(21) Appl. No.: 15/109,604

(22) PCT Filed: Jan. 4, 2014

(86) PCT No.: PCT/CN2014/070132
§ 371 (c)(1),
(2) Date: Jul. 1, 2016

(87) PCT Pub. No.: WO2015/100738
PCT Pub. Date: Jul. 9, 2015

(65) Prior Publication Data
US 2016/0337574 A1    Nov. 17, 2016

(51) Int. Cl.
| | |
|---|---|
| *H04N 5/232* | (2006.01) |
| *G02B 23/16* | (2006.01) |
| *G02B 7/00* | (2006.01) |
| *G01C 21/02* | (2006.01) |
| *G02B 23/06* | (2006.01) |

(52) U.S. Cl.
CPC ......... *G02B 23/16* (2013.01); *H04N 5/23212* (2013.01); *G01C 21/025* (2013.01); *G02B 7/005* (2013.01); *G02B 23/06* (2013.01)

(58) Field of Classification Search
None
See application file for complete search history.

(56) References Cited

U.S. PATENT DOCUMENTS

| | | | | |
|---|---|---|---|---|
| 7,339,731 | B2 * | 3/2008 | Baun | .............. G01S 3/7867 250/203.6 |
| 7,482,564 | B2 * | 1/2009 | Baun | .............. G01S 3/7867 250/203.1 |

(Continued)

FOREIGN PATENT DOCUMENTS

| | | |
|---|---|---|
| CN | 101813823 A | 8/2010 |
| CN | 202334667 U | 7/2012 |

(Continued)

*Primary Examiner* — Justin P Misleh
(74) *Attorney, Agent, or Firm* — SZDC Law P.C.

(57) ABSTRACT

An automatic astronomical observation system includes an astronomical telescope (1), a star finding servo motor (2) for driving the astronomical telescope (1), and a control system (4). A focusing servo motor (3) is connected to a lens regulation mechanism of the astronomical telescope (1); a CMOS sensor (5) used for obtaining a starry sky image is disposed on the astronomical telescope (1); the control system (4) includes a control chip, a gyroscope, a memory, and a WIFI communication interface; the control chip is electrically connected to the CMOS sensor (5), the gyroscope, the memory, and the WIFI communication interface; a handheld device provided with a WIFI communication interface is disposed by being fitted to the control system (4); and a GPS module is disposed in the control system (4) or the handheld device. Also provided is an automatic astronomical observation method.

7 Claims, 2 Drawing Sheets

(56) References Cited

U.S. PATENT DOCUMENTS

| | | | |
|---|---|---|---|
| 2005/0046581 A1* | 3/2005 | Lemp | G09B 23/06 340/686.1 |
| 2006/0103926 A1* | 5/2006 | Meyers | G02B 23/16 359/430 |
| 2006/0158722 A1 | 7/2006 | Fujimoto et al. | |
| 2007/0115545 A1 | 5/2007 | Chen et al. | |
| 2008/0018995 A1* | 1/2008 | Baun | G02B 7/003 359/399 |
| 2014/0085717 A1* | 3/2014 | Baun | G01S 3/7867 359/429 |
| 2015/0377999 A1* | 12/2015 | Shen | H04N 5/232 348/144 |

FOREIGN PATENT DOCUMENTS

| | | |
|---|---|---|
| CN | 103076754 A | 5/2013 |
| CN | 203241611 U | 10/2013 |

* cited by examiner

AUTOMATIC ASTRONOMICAL OBSERVATION SYSTEM AND OBSERVATION METHOD

This application is a national stage application of PCT/CN2014/070132, filed on Jan. 4, 2014, which is incorporated by reference for all purposes as if fully set forth herein.

FIELD OF THE INVENTION

The present invention relates to an astronomical observation system, particularly to an astronomical observation system with the functions of automatic star finding, automatic focusing and image storage, and an astronomical observation method using the system.

BACKGROUND OF THE INVENTION

During astronomical observations, amateur astronomers usually use one of such processes: (1) Determining the position of celestial bodies by consulting astronomical almanac, star maps, etc.; adjusting the telescope, looking for the celestial body for observing, after locating the celestial body, setting the photographic equipment to take photos. During the whole observation process, there are a lot of inconvenience, such as, one must consult the relevant information to determine the positions of celestial bodies before each observation as the celestial bodies are constantly moving in the sky, but the ephemeris is heavy and non-intuitive, the simple star chart can only used to observe at specified times due to the moving of the celestial bodies; to adjust the telescope manually is very complicated; and it's not convenient to take photos through the telescope. (2) Using a guiding software and an electric equatorial to achieve automatic star tracking. This method requires calibrating the position of the telescope first, the guiding process is complicated to operate, the interactive interface is unfriendly, and one should have much astronomical background knowledge to complete the operation.

The methods described above all need manual focus to get a good observation effect, it is trouble to operate when tracking celestial bodies or taking a long time exposure for photograph, and there is a high threshold for beginners so it will hinder the spread of astronomical observations.

Meanwhile, when taking the photos of the celestial bodies, a dedicated interface needs to be used to connect the camera to the eyepiece; it is not convenient for immediate viewing and network sharing.

In the prior art, a Chinese patent application with a publication number CN1808207A discloses an automatic finder control device for a portable astronomical telescope, using a main controller with microprocessor and the like, an equatorial drive controllers, GPS and DC motor, to control the telescope for pointing and tracking the target object. The device structure is complex, the main controller obtains data of stars stored in FLASH, using the information of time and location obtained from GPS, to deal with the calculations such as annual parallax calculation, solar parallax calculation, aberration calculation, calculation of precession, nutation calculation, and atmospheric refraction computing, the control process is complicated, and the device can not achieve automatically focus and photograph of celestial bodies.

A China Patent with a publication number CN101017240A discloses a video CCD auto guider method for an astronomical telescope, proposes to use the CCD for telescope auto guiding. However, in this method, the computer obtains video images by a video capture card, which means the telescope connects with the computer via wired connection, so it is typically used for the observatory and other fixed occasions, not suitable for using in mobile occasions by amateur astronomers. At the same time, this method also does not give an automatic focus method.

For ease of movement and control, a Chinese Utility Model with a publication number CN202334667U discloses an astronomical telescope automatic star finding and tracking device based on Android mobile phone control, using the Android phone to select objects to be observed on the touch screen, connected by WiFi to transfer a set of drive parameters to a control module, the control module controls the servo motor to rotate the telescope via the drive module to achieve star finding and tracking automatically. Although this means achieves a wireless control, and is easy to carry and use, but the device does not have the function of autofocus or the photograph of celestial bodies. If transferring the images via the WiFi in normal ways, the image data need for auto finding and auto focus is too large to transfer, it is difficult to achieve real-time image transmission and detection control.

In addition, the prior art lacks suitable auto focus method for portable astronomical observation system. As the distance of the celestial bodies is very large in astronomical observations, the focus method is different with such in conventional photography. The literature "An astronomical telescope automatic focusing system based on image definition evaluation" published in "Astronomical Research & Technology" 2008, 3, disclosed an automatic focusing method for telescope based on image definition evaluation. However, this method is only applicable to fixed stars, using only the near roundness and size of the stars as the basis for focusing, the relationship between the focusing function and the two parameters is not described, that is, the specific calculation method for focusing function is not given, and when using the method in focus searching, it is easy to fall into local maxima without finding the global optimum.

Therefore, a new automated astronomical observation system should be provided to accommodate the needs of amateur astronomers.

SUMMARY OF THE INVENTION

The object of the present invention is to provide an automatic astronomical observation system to achieve automatic focusing and photographing of celestial bodies, and to be controlled wirelessly.

To achieve the above object, the present invention adopts the technical solution as: An automatic astronomical observation system comprises an astronomical telescope, a star finding servo motor for driving the astronomical telescope, and a control system, a focusing servo motor is connected to a lens regulation mechanism of the astronomical telescope; a CMOS sensor used for obtaining a starry sky image is disposed on the astronomical telescope; the control system comprises a control chip, a gyroscope, a memory, and a WIFI communication interface; the control chip is electrically connected to the CMOS sensor, the gyroscope, the memory, and the WIFI communication interface; a handheld device provided with a WIFI communication interface is disposed by being fitted to the control system; and a GPS module is disposed in the control system or the handheld device.

In the above technical solution, said control chip is a field programmable gate array (FPGA).

An automatic astronomical observation method using the automatic astronomical observation system described above, comprising the steps of automatic star finding, automatic focusing and image storing;

Said automatic star finding step comprises:

Getting the geographic coordinates and time information of the current position by GPS module, checking and obtaining the current sky map using the handheld device; sending the sky map of the celestial body to be observed to the control system from the handheld device; the control system obtains information from the gyroscope for determining the inclination of the tube; according to the deviation between the current position of the tube and the direction pointing to the celestial body to be observed, the control system controls the move of the star finding servo motor, to adjust the horizontal position and angle of elevation of the tube, to find the star automatically;

Said automatic focusing step comprises:

The Control system controls the CMOS image sensor to obtain an image signal; the image signal is transmitted to the handheld device via the WIFI communication interface; the handheld device processes the image, for the planets in the solar system, using the maximum value of the high-frequency component of the image as the focus aim, for extrasolar stars, using the maximum contrast as the focus aim, the handheld device sends focus information to the control system via the WIFI communication interface for controlling the movement of the focusing servo motor, to focus automatically.

In the above technical solution, for the planets in the solar system, the automatic focus method is:

(1) Getting the image, in which P (i,j) represents the gray scale value of the point (i, j) in the image, where i is an integer of 1~m, j is an integer of 1~n, m and n are the number of horizontal and vertical pixels in the image;

(2) Using adaptive low-pass filter based on the least mean square algorithm (LMS), to filter out the high frequency components, to obtain the image $P_r(i,j)$; let the algorithm automatically adjust the filter parameters based on statistical properties of the image to achieve the best filtering effect;

(3) Calculating the energy of the image before filtering $$E_P = \sum_{i=1}^{m} \sum_{j=1}^{n} P^2(i, j),$$

and the energy of the image after filtering $$E_{P_r} = \sum_{i=1}^{m} \sum_{j=1}^{n} P_r^2(i, j)$$

respectively;

(4) Calculating the energy lost after filtering, which is $E_i = E_P - E_{P_r}$, the focus processing is completed when $E_i$ get to the maximum.

As in the process of adjusting the focal length, the curve of the value of $E_i$ is unimodal, in order to search the optimum focal length quickly, the focusing method is preferred:

① setting the focal length to change in the step value $F_c$; the maximum step value is $F_{max}$, the minimum step value is $F_{min}$, that is, if $F_c > F_{max}$ after the change of the step value of the focal length then let $F_c = F_{max}$; if $F_c < F_{min}$ after the change of the step value of the focal length then let $F_c = F_{min}$; the step value of the focal length changes in $\Delta F$ in each adjustment (whose minimum value is determined by the mechanical properties, this value can be set by software);

② setting the step value of the focal length to $F_c = F_{max}$;

③ rotating the focus servo motor counterclockwise to the limit position, getting the image of the current location, calculating the energy lost after filtering, which is $E_{i1}$;

④ rotating the focus servo motor clockwise so that the focal length changes $F_c$; getting the image of the current location, calculating thee energy lost after filtering, which is $E_{i2}$;

⑤ rotating the focus servo motor clockwise so that the focal length changes $F_c$; getting the image of the current location, calculating thee energy lost after filtering, which is $E_{i3}$;

⑥ If $E_{i1} < E_{i2} < E_{i3}$, indicating that the direction of the adjustment makes the image clearer, then, if $E_{i2} - E_{i1} < E_{i3} - E_{i2}$, then let $F_c = F_c + \Delta F$, namely to increase the step value; if $E_{i2} - E_{i1} > E_{i3} - E_{i2}$, then let $F_c = F_c - \Delta F$, namely to reduce the step value; let $E_{i1} = E_{i2}$, and repeat step ⑤;

if $E_{i3} < E_{i2} < E_{i1}$, indicate the direction of the adjustment makes the image fuzzier, the initial step value of the focal length is too large, let $F_c = F_c - \Delta F$, and repeat steps ③~⑤, if $F_c = F_{min}$, rotates the focus servo motor counterclockwise to the limit position, this position is the best focus position;

if $E_{i3} < E_{i2} > E_{i1}$, indicating the position of the focus is near the position corresponding to $E_{i2}$, then set $F_c = F_{min}$;

⑦ rotating the focus servo motor counterclockwise so that the focal length changes $F_c$; getting the image of the current location, calculating thee energy lost after filtering, which is $E_{im}$;

⑧ If $E_{im} > E_{i3}$, then let $E_{i3} = E_{im}$, repeat step ⑦; if $E_{im} > E_{i3}$, then rotating the focus servo motor clockwise so that the focal length changes $F_c$, the position is the best focus position.

In the above technical solution, for extrasolar stars, the automatic focus method is:

(1) Getting the image P (i,j), where i is an integer of 1~m, j is an integer of 1~n, m and n are the number of horizontal and vertical pixels in the image, P represents the gray scale value of the point (i, j) in the image;

(2) Calculating the image grey scale probability density function G(r), i.e. the ratio of the number of pixels with gray scale r and the total number of pixels of the image;

(3) Calculating the contrast $$C = \sum_{i=1}^{m} \sum_{j=1}^{n} \left( |P(i+1, j) - P(i, j)|^2 G(|P(i+1, j) - P(i, j)|) + \right.$$
$$|P(i-1, j) - P(i, j)|^2 G(|P(i-1, j) - P(i, j)|) +$$
$$|P(i, j+1) - P(i, j)|^2 G(|P(i, j+1) - P(i, j)|) +$$
$$\left. |P(i, j-1) - P(i, j)|^2 G(|P(i, j-1) - P(i, j)|) \right);$$

(4) Adjusting the focus servo motor based on the value of C, when C takes the maximum value, the focus is achieved.

As in the process of adjusting the focal length, the curve of the value of C is unimodal, in order to search the optimum focal length quickly, the focusing method is preferred:

① setting the focal length to change in the step value $F_c$, the maximum step value is $F_{max}$, the minimum step value is $F_{min}$, that is, if $F_c > F_{max}$ after the change of the step value of the focal length then let $F_c = F_{max}$; if $F_c < F_{min}$ after the change of the step value of the focal length then let $F_c = F_{min}$; the step value of the focal length changes in $\Delta F$ in each adjustment (whose minimum value is determined by the mechanical properties, this value can be set by software);

② setting the step value of the focal length to $F_c=F_{max}$;

③ rotating the focus servo motor counterclockwise to the limit position, getting the image of the current location, calculating the contrast, which is $C_1$;

④ rotating the focus servo motor clockwise so that the focal length changes $F_c$; getting the image of the current location, calculating thee contrast, which is $C_2$;

⑤ rotating the focus servo motor clockwise again so that the focal length changes $F_c$; getting the image of the current location, calculating thee contrast, which is $C_3$;

⑥ If $C_1<C_2<C_3$, indicating that the direction of the adjustment makes the image clearer, then, if $C_2-C_1<C_3-C_2$, then let $F_c=F_c+\Delta F$, namely to increase the step value; if $C_2-C_1>C_3-C_2$, then let $F_c=F_c-\Delta F$, let $C_1=C_2$ and $C_2=C_3$, and repeat step ⑤;

if $C_3<C_2<C_1$, indicate the direction of the adjustment makes the image fuzzier, the initial step value of the focal length is too large, let $F_c=F_c-\Delta F$, and repeat steps ③~⑤, if $F_c=F_{min}$, rotates the focus servo motor counterclockwise to the limit position, this position is the best focus position;

if $C_1<C_2>C_3$, indicating the position of the focus is near the position corresponding to $C_2$, then set $F_c=F_{min}$;

⑦ rotating the focus servo motor counterclockwise so that the focal length changes $F_c$; getting the image of the current location, calculating thee contrast, which is $C_m$;

⑧ If $C_m>C_3$, then let $C_3=C_m$, repeat step ⑦; if $C_m<C_3$, then rotating the focus servo motor clockwise so that the focal length changes $F_c$, the position is the best focus position.

In the above technical solution, when performing autofocus, the process to transmit images via the WIFI communication interface comprises, compressing the image, $P(i,j)$ represents the gray scale value of the point $(i, j)$ in the image, where i is an integer of 1~m, j is an integer of 1~n, m and n are the number of horizontal and vertical pixels in the image, when i, j are both odd, let $P(i, j)=[P(i, j)+P(i+1, j)+P(i, j+1)+P(i+1, j+1)]/4$, use the mean value of the grey value of the four adjacent pixels to represent the gray value, and transmit the compressed image; when dealing with image storage after focus, transfer the uncompressed image through the WIFI communication interface.

With the above technical solution, the present invention has the following beneficial effects:

1. Based on the information like current position, time and tube angles obtained from the gyroscope and GPS, the present invention can complete the automatic star finding process without calibration, so it can automatically point to the celestial body predetermined to observe;

2. The present invention achieves the auto focus of the telescope based on image processing, wherein using different focus method depending on different celestial bodies to be observed, for the celestial bodies in the solar system, take the clear and detailed observations of stars as the evaluation target, for extrasolar stars, take the observation of the overview of the nebula as the evaluation target, so that it can reach adaptively and fast autofocus;

3. The present invention uses a wireless handheld device as control device, using pixel binding technology to transmit smaller scale images during focusing, so as to complete the focusing process quickly; after focusing, obtain and transmit images with more pixels according to the needs, to meet the demand for observation, storage and sharing of the celestial images.

BRIEF DESCRIPTION OF THE DRAWINGS

Wherein: 1, astronomical telescopes; 2, star finding servo motor; 3, focusing servo motor; 4, the control system; 5, CMOS sensor.

DETAILED DESCRIPTION OF THE EMBODIMENTS

The present invention will be further described below with reference to drawings and examples.

Embodiment

Figure 1:
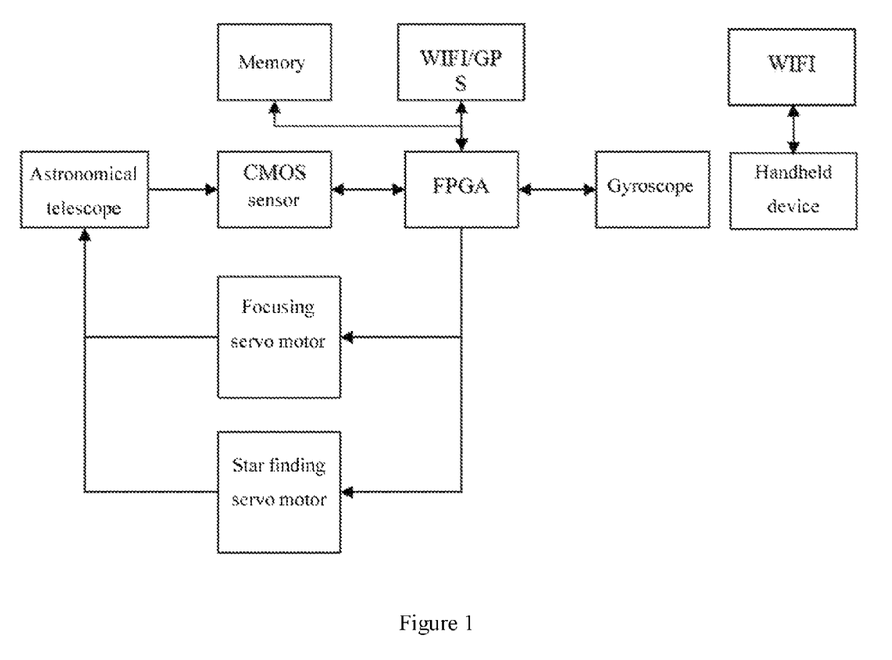
FIG. 1 is a schematic diagram of the hardware of the system in embodiment 1.
Figure 2:
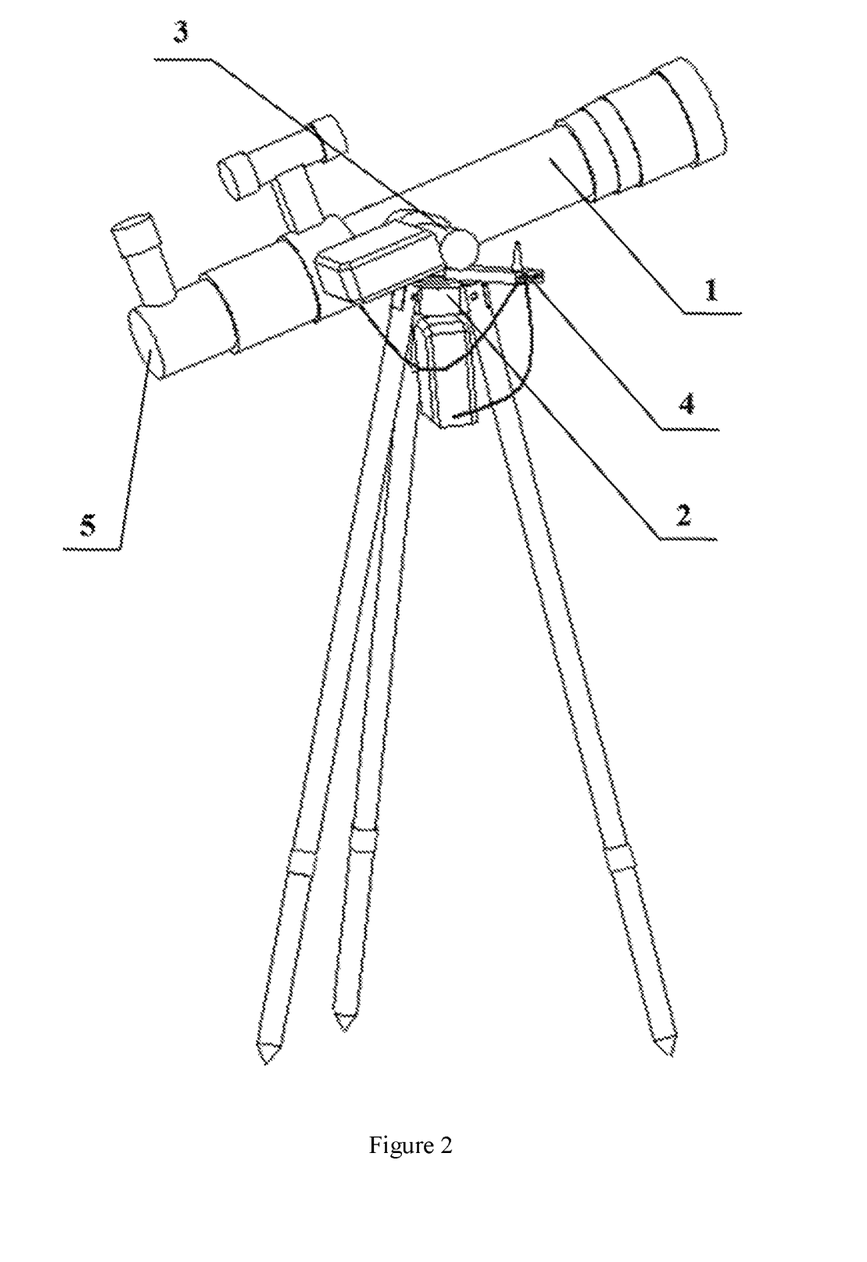
FIG. 2 is a schematic diagram of the telescope system in the embodiment.

Refer to FIG. 1 and FIG. 2, an automatic astronomical observation system constituted with a telescope system and a handheld device. The telescope system comprises an astronomical telescope 1, a star finding servo motor 2 for driving the astronomical telescope, a focusing servo motor 3 connected to a lens regulation mechanism of the astronomical telescope, and a control system 4; a CMOS sensor 5 used for obtaining a starry sky image is disposed on the astronomical telescope 1; the control system comprises a field programmable gate array (FPGA), a gyroscope, a memory, a WIFI communication interface, and a GPS module; the control chip is electrically connected to the CMOS sensor, the gyroscope, the memory, the WIFI communication interface and the GPS module; said handheld device has a WIFI communication interface, the handheld device communicate with the control system through the WIFI communication interface.

In this embodiment, the handheld device may be a tablet or smartphone supporting Android/IOS system with a WIFI communication interface. A software will be run on the device to display the current sky map, choose the stars to be observed, show to pictures of the celestial bodies, share the pictures online, introduce astronomical knowledge, transmit data with the telescope in both way, etc. The astronomical telescope can be a Schmidt-Cassegrain telescope; the star finder of the astronomical telescope may be consisted by a biaxially DC servo motor with an encoder and an electric equatorial.

Setting by a software, the system can achieve the following functions: Opening a software on a handheld device, showing the current observable sky map based on the current position and time information obtained through GPS, by clicking or searching mode to specify the celestial body wishing to observe and transmit the information to the telescope control system via WIFI, the control system adjusts a DC servo motor based on the information obtained from the GPS module and a gyroscope module, so that the telescope automatically track the selected target, while according to the set observation mode, focus using the autofocus method based on image processing to get a clear view of the stars. During this process, the CMOS sensor continuously collect star images and transferred to smart handheld devices via WIFI module for display, after performing the focus process, the functions of image storing, post-processing, network sharing and so on can be selected.

To achieve these functions, the following techniques are used:

1, Autofocus technology based on image processing

Using different algorithms depending on the celestial bodies chosen for observation:

(1) For the observation of the planets in the solar system

In the solar system, the planets can be seen in the telescope with much larger size, so the target is to see the clear details of the planet.

According to the knowledge of image processing, the captured image will be clearer with more high frequency component information. So the focus servo motor can be rotated correspondingly, to let the clarity reaches the maximum value. The detail steps are described as following:

a) Getting the image P (i,j), in which i:1~m, j:1~n, P represents the gray level of a point in the image;

b) Using adaptive low-pass filter based on the least mean square algorithm (LMS), to filter out the high frequency components, to obtain the image $P_r(i, j)$;

c) Calculating the energy of the image before filtering $$E_P = \sum_{i=1}^{m} \sum_{j=1}^{n} P^2(i, j),$$

and the energy of the image after filtering $$E_{P_r} = \sum_{i=1}^{m} \sum_{j=1}^{n} P_r^2(i, j)$$

respectively;

d) Calculating the energy lost after filtering, which is $E_i = E_P - E_{P_r}$, the focus processing is completed when $E_i$ get to the maximum.

As in the process of adjusting the focal length, the curve of the value of $E_i$ is unimodal, in order to search the optimum focal length quickly, the focusing method is:

a) setting the focal length to change in the step value $F_c$; the maximum step value is $F_{max}$, the minimum step value is $F_{min}$, that is, if $F_c > F_{max}$ after the change of the step value of the focal length then let $F_c = F_{max}$; if $F_c < F_{min}$ after the change of the step value of the focal length then let $F_c = F_{min}$; the step value of the focal length changes in $\Delta F$ in each adjustment (whose minimum value is determined by the mechanical properties, this value can be set by software);

b) Setting the step value of the focal length to $F_c = F_{max}$;

c) Rotating the focus servo motor counterclockwise to the limit position, getting the image of the current location, calculating the energy lost after filtering, which is $E_{i1}$;

d) Rotating the focus servo motor clockwise so that the focal length changes $F_c$; getting the image of the current location, calculating the energy lost after filtering, which is $E_{i2}$;

e) Rotating the focus servo motor clockwise so that the focal length changes $F_c$; getting the image of the current location, calculating the energy lost after filtering, which is $E_{i3}$;

f) If $E_{i1} < E_{i2} < E_{i3}$, indicating that the direction of the adjustment makes the image clearer, then, if $E_{i2} - E_{i1} < E_{i3} - E_{i2}$, then let $F_c = F_c + \Delta F$, namely to increase the step value; if $E_{i2} - E_{i1} > E_{i3} - E_{i2}$, then let $F_c = F_c - \Delta F$, namely to reduce the step value; let $E_{i1} = E_{i2}$, and repeat step ⑤;

if $E_{i3} < E_{i2} < E_{i1}$, indicate the direction of the adjustment makes the image fuzzier, the initial step value of the focal length is too large, let $F_c = F_c - \Delta F$, and repeat steps ③~⑤, if $F_c = F_{min}$, rotates the focus servo motor counterclockwise to the limit position, this position is the best focus position;

if $E_{i3} < E_{i2} > E_{i1}$, indicating the position of the focus is near the position corresponding to $E_{i2}$, then set $F_c = F_{min}$;

g) Rotating the focus servo motor counterclockwise so that the focal length changes $F_c$; getting the image of the current location, calculating the energy lost after filtering, which is $E_{im}$;

h) If $E_{im} > E_{i3}$, then let $E_{i3} = E_{im}$, repeat step ⑦; if $E_{im} < E_{i3}$, then rotating the focus servo motor clockwise so that the focal length changes $F_c$, the position is the best focus position.

After performing the focus process, photographing the celestial bodies and transmitting to the handheld device for storage.

(2) Extrasolar Stars

For the observation of the overview of the nebula, take the maximum contrast as the focus target. The detail steps are described as following:

a) Getting the image P (i,j), in which i:1~m, j:1~n, P represents the gray level of a point in the image;

b) Calculating the contrast $$C = \sum_{i=1}^{m} \sum_{j=1}^{n} \left( |P(i+1, j) - P(i, j)|^2 G(|P(i+1, j) - P(i, j)|) + \right.$$

$$|P(i-1, j) - P(i, j)|^2 G(|P(i-1, j) - P(i, j)|) +$$

$$|P(i, j+1) - P(i, j)|^2 G(|P(i, j+1) - P(i, j)|) +$$

$$\left. |P(i, j-1) - P(i, j)|^2 G(|P(i, j-1) - P(i, j)|) \right);$$

c) The image will be clearer with larger C. When C takes the maximum value, the focus is achieved.

As in the process of adjusting the focal length, the curve of the value of C is unimodal, in order to search the optimum focal length quickly, the focusing method is:

a) setting the focal length to change in the step value $F_c$; the maximum step value is $F_{max}$, the minimum step value is $F_{min}$, that is, if $F_c > F_{max}$ after the change of the step value of the focal length then let $F_c = F_{min}$; if $F_c < F_{min}$ after the change of the step value of the focal length then let $F_c = F_{min}$; the step value of the focal length changes in $\Delta F$ in each adjustment (whose minimum value is determined by the mechanical properties, this value can be set by software);

b) Setting the step value of the focal length to $F_c = F_{max}$;

c) Rotating the focus servo motor counterclockwise to the limit position, getting the image of the current location, calculating the contrast, which is $C_1$;

d) Rotating the focus servo motor clockwise so that the focal length changes $F_c$; getting the image of the current location, calculating the contrast, which is $C_2$;

e) Rotating the focus servo motor clockwise again so that the focal length changes $F_c$; getting the image of the current location, calculating the contrast, which is $C_3$;

f) If $C_1 < C_2 < C_3$, indicating that the direction of the adjustment makes the image clearer, then, if $C_2 - C_1 < C_3 - C_2$, then let $F_c = F_c + \Delta F$, namely to increase the step value; if $C_2 - C_1 > C_3 - C_2$, then let $F_c = F_c - \Delta F$, let $C_1 = C_2$ and $C_2 = C_3$, and repeat step ⑤;

if $C_3 < C_2 < C_1$, indicate the direction of the adjustment makes the image fuzzier, the initial step value of the focal length is too large, let $F_c = F_c - \Delta F$, and repeat steps ③~⑤, if $F_c=F_{min}$, rotates the focus servo motor counterclockwise to the limit position, this position is the best focus position;

if $C_1<C_2>C_3$, indicating the position of the focus is near the position corresponding to $C_2$, then set $F_c=F_{min}$;

g) Rotating the focus servo motor counterclockwise so that the focal length changes $F_c$; getting the image of the current location, calculating the contrast, which is $C_m$;

h) If $C_m>C_3$, then let $C_3=C_m$, repeat step ⑦; if $C_m<C_3$, then rotating the focus servo motor clockwise so that the focal length changes $F_c$, the position is the best focus position.

After performing the focus process, photographing the celestial bodies and transmitting to the handheld device for storage.

2. The image transmission technology between the handheld device and the telescope.

The images transmit between the handheld device and the telescope by WIFI. In the process of focusing, in order to increase the speed of interaction, the images are not needed to transmit in full, so a pixel binding technology is adopted to decrease the size of the image transmitted, so as to complete the focusing process quickly; after focusing, obtain and transmit images with more pixels according to the needs, to meet the demand for observation, storage and sharing of the celestial images.

With the choice of the different data size in different situation corresponding to the focus process, it can meet the demands of the fast focus, and it also can transmit high quality images for the users to save after focusing. The basic process is as follows: Let CMOS/CCD have the pixel of X of the full size, when focusing is not completed, the gray scale values of the four adjacent pixels is averaged at that point for transmission, as follows:

| P(i, j)     | P(i, j + 1)     |
| P(i + 1, j) | P(i + 1, j + 1) |

Calculating as $P(i, j)=[P(i, j)+P(i+1, j)+P(i, j+1)+P(i+1, j+1)]/4$, so the total number of pixels transmitted will be X/4, which greatly reduces the amount of data transmitted during focusing. The technology has not been described in the prior literatures or patents in the field of telescope image transmission.

3. An automatic star finding technology without calibration.

Based on the information like current position, time and tube angles obtained from the gyroscope and GPS, the system can complete the automatic star finding process without calibration, so it can automatically point to the celestial body predetermined to observe.

The technique relies on access to current geographical coordinates and time information through GPS module, so that you can query the current sky map drawn under the observation points, so as to determine the stars can be observed by the user. The handheld device can show the corresponding map of the sky on the screen after obtaining these information. These information will be transmitted to the control system of the telescope via WIFI when the user selects the stars to be observed. The telescope tube's inclination data can be obtained through the gyroscope module, that shows the direction of the telescope to the star map, adjusting the tube of the telescope through calculating the deviation between the position of the star and the tube, which including the angle in horizon plate and the inclination, when the deviation is less than the set threshold, the automatic star finding is completed.

By using the techniques described above, the present embodiment achieves automatic star finding, automatic focusing and wireless operation of astronomical telescope.

What is claimed is:

1. An automatic astronomical observation method comprising providing an automatic astronomical observation system and the steps of automatic star finding, automatic focusing and image storing, wherein, said automatic astronomical observation system comprises:

an astronomical telescope, a star finding servo motor for driving the astronomical telescope, and a control system, wherein a focusing servo motor is connected to a lens regulation mechanism of the astronomical telescope; a CMOS sensor used for obtaining a starry sky image is disposed on the astronomical telescope; said control system comprises a control chip, a gyroscope, a memory, and a WIFI communication interface; said control chip is electrically connected to the CMOS sensor, the gyroscope, the memory, and the WIFI communication interface; a handheld device provided with a WIFI communication interface is disposed by being fitted to the control system; and a GPS module is disposed in the control system or the handheld device;

said automatic star finding step comprises:

getting geographic coordinates and a time information of a current position by the GPS module, checking and obtaining a current sky map using the handheld device; sending a sky map of a celestial body to be observed to the control system from the handheld device; the control system obtains information from the gyroscope for determining an inclination of a tube; according to a deviation between the current position of the tube and a direction pointing to the celestial body to be observed, the control system controls a move of the star finding servo motor, to adjust a horizontal position and an angle of elevation of the tube, to find the star automatically; and said automatic focusing step comprises:

the control system controls the CMOS image sensor to obtain an image signal; the image signal is transmitted to the handheld device via the WIFI communication interface; the handheld device processes the image signal, for planets in a solar system, using a maximum value of a high-frequency component of the image signal as a focus aim, for extrasolar stars, using a maximum contrast as the focus aim, the handheld device sends focus information to the control system via the WIFI communication interface for controlling the movement of the focusing servo motor, to focus automatically.

2. The automatic astronomical observation method according to claim 1, wherein for the planets in the solar system, the automatic focus step comprises:

(1) getting the image signal, in which P (i,j) represents a gray scale value of a point (i, j) in the image signal, where i is an integer of 1~m, j is an integer of 1~n, m and n are numbers of horizontal and vertical pixels in the image signal;

(2) using an adaptive low-pass filter based on a least mean square algorithm (LMS), to filter out high frequency components, to obtain the image signal $P_r(i,j)$;

(3) calculating an energy of the image signal before filtering $$E_P = \sum_{i=1}^{m} \sum_{j=1}^{n} P^2(i, j),$$

and an energy of the image signal after filtering $$E_{P_r} = \sum_{i=1}^{m} \sum_{j=1}^{n} P_r^2(i, j)$$

respectively;

(4) calculating the energy lost after filtering, which is $E_i=E_P-E_{P_r}$, the automatic focus step is completed when $E_i$ gets to a maximum.

3. The automatic astronomical observation method according to claim 2, wherein, the automatic focus step comprises:

①  setting a focal length to change in a step value $F_c$; a maximum step value is $F_{max}$, a minimum step value is $F_{min}$, that is, if $F_c>F_{max}$ after a change of the step value of the focal length then let $F_c=F_{max}$; if $F_c<F_{max}$ after the change of the step value of the focal length then let $F_c=F_{min}$; the step value of the focal length changes in $\Delta F$ in each adjustment;

②  setting the step value of the focal length to $F_c=F_{max}$;

③  rotating a focus servo motor counterclockwise to a limit position, getting an image of a current location, calculating the energy lost after filtering, which is $E_{i1}$;

④  rotating the focus servo motor clockwise so that the focal length changes $F_c$; getting the image of the current location, calculating the energy lost after filtering, which is $E_{i2}$;

⑤  rotating the focus servo motor clockwise so that the focal length changes $F_c$; getting the image of the current location, calculating the energy lost after filtering, which is $E_{i3}$;

⑥  if $E_{i1}<E_{i2}<E_{i3}$, indicating that a direction of an adjustment makes an image clearer, then, if $E_{i2}-E_{i1}<E_{i3}-E_{i2}$, then let $F_c=F_c+\Delta F$, namely to increase the step value; if $E_{i2}-E_{i1}>E_{i3}-E_{i2}$, then let $F_c=F_c-\Delta F$, namely to reduce the step value; let $E_{i1}=E_{i2}$, and repeat step ⑤;

if $E_{i3}<E_{i2}<E_{i1}$, indicate the direction of the adjustment makes the image fuzzier, an initial step value of the focal length is too large, let $F_c=E_c-\Delta F$, and repeat steps ③~⑤, if $F_c=F_{min}$, rotates the focus servo motor counterclockwise to the limit position, this position is a best focus position;

if, $E_{i3}<E_{i2}<E_{i1}$ indicating a position of a focus is near a position corresponding to $E_{i2}$, then set $F_c=F_{min}$;

⑦  rotating the focus servo motor counterclockwise so that the focal length changes $F_c$; getting the image of the current location, calculating the energy lost after filtering, which is $E_{im}$, ⑧  if $E_{im}>E_{i3}$ then let repeat step ⑦; if $E_{im}<E_{i3}$ then rotating the focus servo motor clockwise so that the focal length changes $F_c$, the position is the best focus position.

4. The automatic astronomical observation method according to claim 1, wherein, for extrasolar stars, the automatic focus step comprises:

(1) getting image signal P (i,j), where i is an integer of 1~m, j is an integer of 1~n, m and n are numbers of horizontal and vertical pixels in the image signal, P represents a gray scale value of a point (i, j) in the image signal;

(2) calculating an image grey scale probability density function G(r), that is, a ratio of the number of pixels with gray scale r and a total number of pixels of the image signal;

(3) calculating a contrast $$C = \sum_{i=1}^{m} \sum_{j=1}^{n} (|P(i+1, j) - P(i, j)|^2 G(|P(i+1, j) - P(i, j)|) +$$
$$|P(i-1, j) - P(i, j)|^2 G(|P(i-1, j) - P(i, j)|) +$$
$$|P(i, j+1) - P(i, j)|^2 G(|P(i, j+1) - P(i, j)|) +$$
$$|P(i, j-1) - P(i, j)|^2 G(|P(i, j-1) - P(i, j)|));$$

(4) adjusting a focus servo motor based on a value of C, when C takes a maximum value, a focus is achieved.

5. The automatic astronomical observation method according to claim 4, wherein, the automatic focus step comprises:

①  setting a focal length to change in a step value $F_c$; a maximum step value is $F_{max}$, a minimum step value is $F_{min}$, that is, if $F_c>F_{max}$ after a change of a step value of the focal length then let $F_c=F_{max}$; if $F_c<F_{min}$ after the change of the step value of the focal length then let $F_c=F_{min}$; the step value of the focal length changes in $\Delta F$ in each adjustment;

②  setting the step value of the focal length to $F_c=F_{max}$;

③  rotating the focus servo motor counterclockwise to the limit position, getting the image of the current location, calculating the contrast, which is $C_1$;

④  rotating the focus servo motor clockwise so that the focal length changes $F_c$; getting the image of the current location, calculating the contrast, which is $C_2$;

⑤  rotating the focus servo motor clockwise again so that the focal length changes $F_c$; getting the image of the current location, calculating the contrast, which is $C_3$;

⑥  if $C_1<C_2<C_3$, indicating that a direction of an adjustment makes an image clearer, then, if $C_2-C_1<C_3-C_2$, then let $F_c=F_c+\Delta F$, namely to increase the step value; if $C_2-C_1>C_3-C_2$ then let $F_c=F_c-\Delta F$, let and $C_1=C_2$ and $C_2=C_3$, repeat step ⑤;

if $C_3<C_2<C_1$, indicate the direction of the adjustment makes the image fuzzier, an initial step value of the focal length is too large, let $F_c=F_c-\Delta F$, and repeat steps ③~⑤, if $F_c=F_{min}$, rotates the focus servo motor counterclockwise to the limit position, this position is a best focus position;

if $C_1<C_2>C_3$, indicating the position of the focus is near the position corresponding to $C_2$, then set $F_c=F_{min}$;

⑦  rotating the focus servo motor counterclockwise so that the focal length changes getting the image of the current location, calculating the contrast, which is;

⑧  if $C_m>C_3$, then let $C_3=C_m$, repeat step ⑦; if $C_m<C_3$, then rotating the focus servo motor clockwise so that the focal length changes $F_c$, the position is the best focus position.

6. The automatic astronomical observation method according to claim 1, wherein, when performing auto-focus, a process to transmit images via the WIFI communication interface comprises, compressing the image signal, P(i,j)

represents a gray scale value of a point (i, j) in the image signal, where i is an integer of 1~m, j is an integer of 1~n, m and n are numbers of horizontal and vertical pixels in the image signal, when i, j are both odd, let P (i, j)=[P (i, j)+P (i+1, j)+P (i, j+1)+P (i+1, j+1)]/4, use a mean value of the grey value of four adjacent pixels to represent the gray value, and transmit the compressed the image signal; when dealing with image storage after focus, transfer the uncompressed image signal through the WIFI communication interface.

7. The automatic astronomical observation method according to claim 1, wherein said control chip is a field programmable gate array.

\* \* \* \* \*